(12) United States Patent
Karst et al.

(10) Patent No.: US 8,957,345 B2
(45) Date of Patent: Feb. 17, 2015

(54) METHOD FOR CONNECTING A DIAPHRAGM TO A SENSOR HOUSING

(75) Inventors: Dieter Karst, Stein am Rhein (CH); Paul Furter, Russikon (CH); Stefan Brechbuehl, Weinfelden (CH)

(73) Assignee: Kistler Holding AG, Winterthur (CH)

( * ) Notice: Subject to any disclaimer, the term of this patent is extended or adjusted under 35 U.S.C. 154(b) by 0 days.

(21) Appl. No.: 14/127,734

(22) PCT Filed: Jul. 3, 2012

(86) PCT No.: PCT/CH2012/000149
§ 371 (c)(1),
(2), (4) Date: Dec. 19, 2013

(87) PCT Pub. No.: WO2013/003965
PCT Pub. Date: Jan. 10, 2013

(65) Prior Publication Data
US 2014/0201968 A1    Jul. 24, 2014

(30) Foreign Application Priority Data
Jul. 7, 2011  (CH) ...................................... 1138/11

(51) Int. Cl.
*B23K 11/11*   (2006.01)
*G01L 23/10*   (2006.01)
*G01L 1/18*    (2006.01)

(52) U.S. Cl.
CPC ............... *G01L 1/18* (2013.01); *B23K 2201/00* (2013.01); *G01L 23/10* (2013.01)
USPC .......... 219/93; 219/117.1; 228/101; 228/178; 228/182

(58) Field of Classification Search
CPC ......... G01L 7/082; G01L 7/084; G01L 7/086; G01L 1/18; G01L 23/10; B23K 2201/00
USPC ........ 92/89, 90; 361/283.4; 73/315, 705, 721; 228/101, 178, 182, 225, 226; 219/121.14, 121.64, 91.2, 117.1, 75, 219/93
See application file for complete search history.

(56) References Cited

U.S. PATENT DOCUMENTS 4,597,151 A * 7/1986 Zaghi et al. ...................... 92/99
5,265,481 A   11/1993 Sonderegger et al.
(Continued)

FOREIGN PATENT DOCUMENTS

CH   394637   6/1965
CH   702257   5/2011
(Continued)

OTHER PUBLICATIONS

International Search Report, issued Sep. 14, 2012.
(Continued)

*Primary Examiner* — Geoffrey S Evans
(74) *Attorney, Agent, or Firm* — Dority & Manning, P.A.

(57) ABSTRACT

A method is provided for connecting a diaphragm to a housing of a pressure or force sensor, wherein a measurement element is attached in the housing and can capture a load acting from the outside onto the diaphragm during the use of the finished sensor. A housing ring surface or the housing is situated opposite a diaphragm ring surface of the diaphragm, which are subjected to compressive loading by the load during use of the sensor. A first connection is produced in an inner region between the housing ring surface and the diaphragm ring surface until they rest against each other radially outside the first connection. Then a second connection connects the housing ring surface and the diaphragm ring surface to one another radially outside the first connection up to a shared outer edge. Here, a defined connection depth of the entire double connection is maintained.

12 Claims, 1 Drawing Sheet

(56) References Cited

U.S. PATENT DOCUMENTS

| | | |
|---|---|---|
| 5,345,428 A | 9/1994 | Arnold et al. |
| 5,461,924 A | 10/1995 | Calderara et al. |
| 5,501,111 A | 3/1996 | Sonderegger et al. |
| D370,423 S | 6/1996 | Nagai et al. |
| D370,424 S | 6/1996 | Nagai et al. |
| D373,738 S | 9/1996 | Nagai et al. |
| D386,431 S | 11/1997 | Nagai et al. |
| D386,702 S | 11/1997 | Nagai et al. |
| 5,717,390 A | 2/1998 | Hasselbring |
| 5,942,681 A | 8/1999 | Vollenweider et al. |
| 6,459,050 B1 | 10/2002 | Muhs |
| D469,886 S | 2/2003 | Barnett |
| 6,595,064 B2 | 7/2003 | Drewes et al. |
| D550,861 S | 9/2007 | Brabeck et al. |
| 7,423,225 B1 | 9/2008 | Kroll et al. |
| D684,075 S | 6/2013 | Cornu |
| D686,928 S | 7/2013 | Cornu |
| 2002/0014124 A1 | 2/2002 | Drewes et al. |
| 2009/0308168 A1* | 12/2009 | Motoyama ............... 73/717 |
| 2010/0037698 A1* | 2/2010 | Kern et al. ............... 73/715 |
| 2011/0185817 A1* | 8/2011 | Kummer et al. .......... 73/719 |
| 2011/0232974 A1 | 9/2011 | Abercrombie et al. |
| 2012/0266683 A1* | 10/2012 | Pletscher ................. 73/717 |
| 2013/0305834 A1* | 11/2013 | Brode et al. ............. 73/778 |

FOREIGN PATENT DOCUMENTS

| | | |
|---|---|---|
| EP | 0259523 | 3/1988 |
| EP | 0491655 | 6/1992 |
| EP | 0 654 654 | 4/1995 |
| EP | 0 892 259 | 1/1999 |
| WO | WO 01/22044 A1 | 3/2001 |
| WO | WO 02/08712 | 1/2002 |
| WO | WO 03/071242 | 8/2003 |

OTHER PUBLICATIONS

International Preliminary Report on Patentability, Jan. 7, 2014.
International Search Report for PCT/CH2013/000005, issued Feb. 11, 2013.
International Search Report for PCT/CH2012/000134, issued Jul. 31, 2012.
International Preliminary Report on Patentability and Written Opinion for PCT/CH2012/000247, dated May 6, 2014.
International Search Report for PCT/CH2012/000251, issued Mar. 13, 2013.
J. Boby, S. Teral, J.M. Caussignac and M. Siffert, "Vehicle Weighing in Motion with Fibre Sensors", pp. 45-47, Measurement+control, vol. 26, Mar. 1993.

* cited by examiner

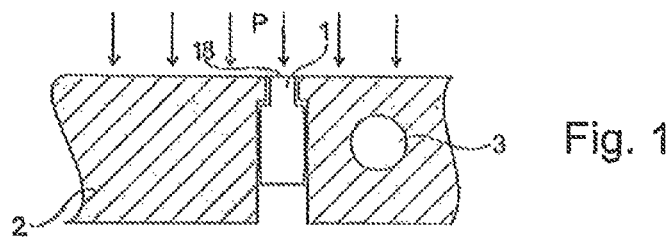
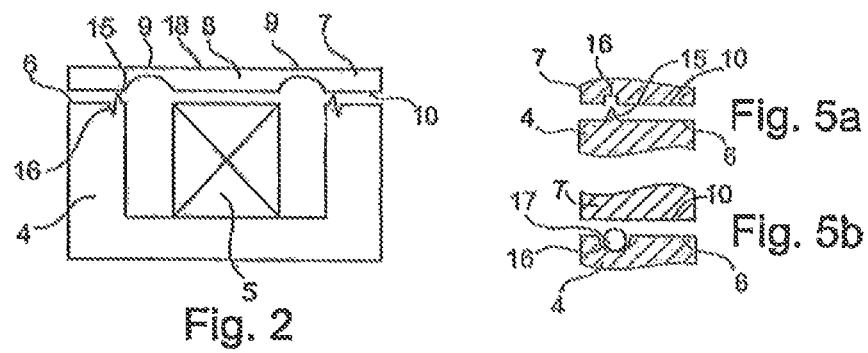
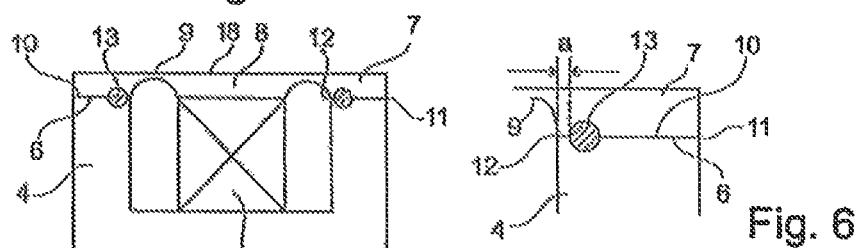
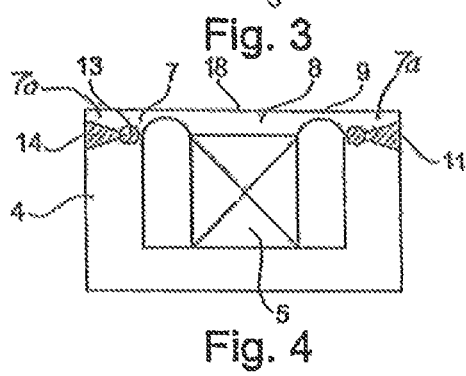
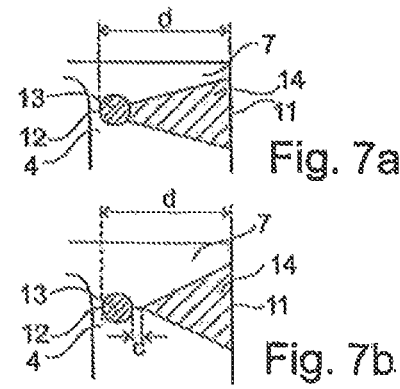

METHOD FOR CONNECTING A DIAPHRAGM TO A SENSOR HOUSING

TECHNICAL FIELD

The invention concerns a method for the connection of a diaphragm to a housing of a pressure or force sensor, wherein a measurement element is mounted in the housing, which element, when the finished sensor is deployed, can register an external load acting on the diaphragm, and wherein a housing ring surface of the housing is located opposite to a diaphragm ring surface of the diaphragm so as to manufacture a connection between these surfaces.

BACKGROUND

Pressure and force sensors are offered in a wide variety of variants. Depending upon the intended fields of deployment for the sensors the latter must be adapted to the respective conditions. Many sensors have a diaphragm that is mounted on the sensor housing and the sensor is tightly sealed by means of this connection. In deployment such diaphragms are, for example, exposed to a pressure chamber. The load generated by the pressure acts on the diaphragm, and as a result of deflection of the latter ultimately causes a signal on a measurement element, which is arranged in the housing behind the diaphragm as viewed in the direction of the pressure.

However, as soon as the diaphragm experiences a deflection that cannot be attributed to an external load acting on the latter, but is, for example, generated by thermal stress or by stresses introduced during mounting, an error signal is generated on the measurement element. In particular this can be the case for front-sealing sensors. These are located with the outer part of the front surface on the component and the seal is thereby generated. In order to exclude stresses on the front face diaphragm caused by mounting, shoulder-sealing sensors are specified. In these sensors the whole of the front face of the sensor is exposed to the load, that is to say, to the pressure chamber or the influence of a force. One example of such a sensor is specified in CH 702257. On a common surface with the housing the diaphragm is welded onto the latter.

In deployment the load in both cases acts on the central region of the diaphragm, which is deflected by the load, and also, depending upon the design, to a greater or lesser extent on the lateral region of the diaphragm, the outer edge. Behind this lateral edge region of the diaphragm, as viewed in the direction of the pressure or force, the connection between diaphragm and housing is located in such sensor designs. In order to subject the measurement element to a certain preload, this connection is often loaded in tension in the course of its manufacture. In deployment the external load applied to the diaphragm acts counter to this tension and generates, from a certain magnitude of the load, a pressure onto this connection.

In CH 394637 a sensor with a preloaded measurement element is described,

In U.S. Pat. No. 4,597,151 a pressure sensor is described whose curved diaphragm is welded onto both the central pressure pad and also a lateral supporting wall. In order to avoid asymmetric effects a second weld is applied on the inner edge of the diaphragm support, near to the start of the curvature.

When deployed certain sensors are subjected to severe short-term temperature fluctuations, for example, if their front face diaphragms are exposed to the pressure chamber in internal combustion engines. In these circumstances the diaphragm heats up quickly, the heat then flows via the connection from the diaphragm to the housing and ultimately distributes itself via further connections to other members of surrounding components until a temperature equilibrium is produced, or until a next combustion event causes the temperature of the diaphragm to rise once again.

The temperature differences between diaphragm and housing lead to errors in the measurements on the measurement element, which can only be monitored with difficulty. The heat flow from the diaphragm into the housing depends significantly on the connection between these components. The better the connection, the more heat that flows. It is problematic, however, if the thermal characteristics and/or the sensitivity of the sensors of the same build are subject to a large scatter. Then it is not possible to estimate, or thus to monitor, the behaviour of a sensor of a build series in the presence of strong temperature fluctuations.

In the prior art the connection between diaphragm and housing is achieved by means of welding, in that as a rule a laser weld seam is applied to the common outer edge between housing and diaphragm. The connection depth depends on the respective parameters of the laser equipment; however, this is subject to rapid ageing. This requires these parameters to be constantly checked and readjusted. If the connection depth is too deep and reaches the interior of the housing then the sensor is destroyed as a result of the heat penetration during the welding process. With too low a connection depth the connection is not defined, as a result of which the heat conduction from the diaphragm into the housing is insufficiently well ensured.

BRIEF SUMMARY OF EXEMPLARY EMBODIMENTS OF THE INVENTION

The object of the present invention is now set as that of specifying a method for the creation of a connection between the diaphragm of the housing of a force or pressure sensor mentioned in the introduction, which leads to a defined characteristic of the sensor in the event of short-term temperature fluctuations.

The object is achieved by means of the features of the method described below. Further advantageous methods also are described below.

The concept underlying the invention is based on the premise that the connection should have a defined connection depth. Here the connection depth is defined as the whole region from the innermost end of the innermost connection to the outermost end of the outermost connection, independently of whether the connection is continuous or interrupted. This connection depth should be accurately prescribed for all sensors of a build and should be reproducibly maintained.

Studies have shown that thermal stresses in the diaphragm and the deflection of the diaphragm significantly affect the sensor characteristics. The thermal stresses and the deflection of the diaphragm ultimately depend upon the connection depth of this connection.

Sensors of the same build with the same connection depth for the connection between diaphragm and housing show the same behaviour in the event of exposure of a pressure chamber that is subject to large temperature fluctuations, such as for example the combustion chamber of an internal combustion engine. However if the connection depth alters from sensor to sensor, then the variance of its measured data can massively increase under the same conditions.

The inventive method ensures that the connection depth is defined. In accordance with this method a first connection is manufactured in the first instance in an inner region between the housing ring surface and the diaphragm ring surface, until these surfaces abut against one another radially outside of this first connection. Subsequently a second connection is manufactured between the housing ring surface and the diaphragm ring surface; this connects the housing and the diaphragm with one another radially outside of the first connection as far as the common outer edge. In this manner a defined connection depth is maintained for the whole double connection.

It has been shown that the reproducibility of the sensors is only ensured if the housing ring surface and the diaphragm ring surface abut against one another without any gaps radially outside of the first connection, before the second connection is manufactured between these surfaces.

BRIEF DESCRIPTION OF THE FIGURES

The invention is explained in more detail in what follows with reference to the figures. Here:

FIG. 1 shows a section of a sensor mounted in a structure, which sensor is exposed to a pressure chamber;

FIG. 2 shows a section of sensor components before their connection;

FIG. 3 shows a section of a sensor that is in course of preparation after the first connection;

FIG. 4 shows a section of a sensor with both connections;

FIG. 5a shows a section of sensor components before their connection in the region of the connection site in an alternative device;

FIG. 5b shows a section of sensor components before their connection in the region of the connection site in another alternative device;

FIG. 6 shows a section of a sensor that is in course of preparation after the first connection in the region of the connection site;

FIG. 7a shows a section of a sensor with both connections in the region of the connection site;

FIG. 7b shows a section of a sensor with both connections in the region of the connection site in an alternative embodiment.

DETAILED DESCRIPTION OF EXEMPLARY EMBODIMENTS OF THE INVENTION

The same reference symbols always denote the same components and circumstances in all figures. FIG. 1 shows a section of an inventive sensor 1 mounted in a mounting structure 2, which is exposed to a pressure chamber P, which for example can be the combustion chamber of an internal combustion engine. The whole end face 18 of the sensor 1, preferably a pressure sensor 1, is exposed to an external load, for example to the pressure chamber P, or to a force.

Such a sensor is represented schematically in FIG. 4. Here the end face 18 is formed by the diaphragm 7. It comprises a central pressure pad 8, a flexible annular region 9 externally adjoining the pressure pad 8, and also a diaphragm ring 7a externally adjoining this region 9, which on the side facing away from the pressure has a diaphragm ring surface 10.

Behind this diaphragm 7 is arranged the housing 4 of the sensor 1, which is securely connected with the diaphragm 7. In the housing is located a measurement element 5, which by virtue of the diaphragm deflection records a signal or a measured value, which allows conclusions to be drawn concerning the external load acting on the diaphragm 7, that is to say, for example, concerning the pressure in the pressure chamber P. The measurement element 5 is preferably a piezoelectric, piezoresistive, or optical measurement element 5. When the inventive sensor 1 is deployed the connection between diaphragm 7 and housing 4 is also always exposed to the load that is acting from the external side on the diaphragm. The inventive sensor 1 can be configured as a shoulder-sealing or as a front-sealing sensor 1.

The mounting structure 2 can in particular be fitted with cooling passages 3, such as is, for example, usually the case for the engine blocks of internal combustion engines. These cooling passages 3 are heat sinks, because there the heat can be quickly led away. With a good connection between the housing 4 of the sensor 1 and the mounting structure 2 the temperature of the housing 4 is thus likewise cooled.

FIG. 2 represents a section of sensor components before their inventive connection; they comprise a diaphragm 7 and a housing 4, with a measurement element 5 contained within the latter. The diaphragm 7 comprises the centrally arranged pressure pad 8, which is bounded by the flexible zone 9. On the side facing away from the direction of the pressure are located in the radially outer region the diaphragm ring, and the diaphragm ring surface 10, which is located opposite a housing ring surface 6 on the housing 4. Here the sensor 1 is represented in a very simplified manner in terms of its components, and is limited here to the features that are of significance for the embodiment of the invention.

The inventive method for connecting a diaphragm 7 to a housing 4 of a pressure or force sensor 1 is described in what follows. A housing 4 with a measurement element 5 and a diaphragm 7, as represented in FIG. 2, are brought together such that the housing ring surface 6 and the diaphragm ring surface 10 are located opposite one another. A first connection 13 is then manufactured in a radially inner region between the housing ring surface 6 and the diaphragm ring surface 10, until the said surfaces 6, 10 abut against one another radially outside of this first connection. FIG. 3 shows the half-finished sensor 1 after this first procedure. In FIG. 6 the region of this connection is once again represented in the same intermediate state, but magnified.

The two surfaces, the housing ring surface 6 and the diaphragm ring surface 10 now lie one upon another and form a common outer edge 11 and a common inner edge 12. On their separation line is located a first connection site 13, which extends both into the diaphragm 7 and also into the housing 4, and which is spaced apart from the common outer edge 11. As shown in FIG. 6, the first connection site 13 is also preferably arranged spaced apart from the common inner edge 12 by a distance "a". This ensures that the interior of the sensor 1 does not experience excess heat during production of the sensor 1, if the first connection is a weld.

After the application of the first connection 13 the diaphragm ring surface 10 and the housing ring surface 6 must abut flat against one another and as free of gaps as possible, because only in this way can it be ensured that the diaphragm 7 is not obliquely attached to the housing 4, which would lead to incorrect behaviour in later measurements.

Following on from the first connection 13 a second connection 14 is manufactured radially outside of the first connection between the housing ring surface 6 and the diaphragm ring surface 10; this connects the housing 4 and the diaphragm 7 with one another as far as the common outer edge 11.

FIG. 4 shows the sensor 1 in this finished state after the application of the second weld 14. FIGS. 7a and 7b represent two scrap sections of this finished sensor in the region of the connections 13, 14, in two different embodiments. In these FIGS. 4, 7 the connection depth "d" is specified as the region that includes the two connection regions 13, 14. Here it should be noted that the two connection regions 13, 14 can overlap, as represented in FIG. 7a, but that they can also be applied spaced apart from one another with a separation distance "c," as represented in FIG. 7b. In both cases the connection depth "d" is the same since it includes the whole region of the connection sites 13, 14, inclusive of any possible separation distance "c" in between. In accordance with the invention a defined connection depth "d" is maintained for the whole double connection 13, 14. However it is to be noted that the second connection 14 may not penetrate more deeply inwards than the first connection 13, since in this case the whole connection depth "d" would alter.

In accordance with the invention the first connection 13 can be a soldered joint, a brazed joint, a welded joint, a resistance welded joint, a bonded joint, or a thermal compression bonded joint. This method allows a connection 13 to be manufactured without having direct access to the connection.

A protrusion 15 is preferably arranged on the housing ring surface 6, or on the diaphragm ring surface 10, on which the first connection 13 is executed by resistance welding as an annular protrusion weld. Near such a protrusion 15 at least one depression 16 can preferably be provided in which welded material of the protrusion 15 can collect in the course of the welding process. This is represented in FIG. 2 and in FIG. 5a, wherein in FIG. 5a the depression 16 is arranged opposite the protrusion 15, whereas in FIG. 2 it is arranged alongside in the same component. In this manner it is ensured that after the first connection no superfluous material from the first connection 13 prevents the housing ring surface 6 and the diaphragm ring surface 10 from abutting against each other. The protrusion 15 and depression 16 here described in each case can be configured in any form, in particular they can be round or cornered, and can be introduced into either the housing 4 or the diaphragm 7. What is represented in each case is only one possible variant, but this should not have any limiting effect on the invention.

Alternatively, as represented in FIG. 5b, the first connection 13 can be executed by resistance welding by means of an insert 17 that is inserted into a depression 16. Here the depression 16 can be adapted in size such that after the welding process no superfluous material protrudes.

The second connection 14 can in particular be a laser welded joint, an electron beam welded joint, a joint welded in accordance with the argon arc method, a tungsten inert gas welded joint (TIG), a protective gas welded joint, or a bonded joint.

This connection site is accessible from the exterior 11 and it is therefore non-critical as long as the penetration depth does not go beyond the first connection and thus does not exceed the prescribed value determined for the penetration depth "d."

By this method a series of sensors of the same type can be manufactured, which deliver measured values with a small amount of scatter, if in deployment they are exposed to severely fluctuating temperatures.

LIST OF REFERENCE SYMBOLS

1 Sensor, pressure sensor
2 Mounting structure
3 Cooling passage
4 Housing
5 Measurement element
6 Housing ring surface
7 Diaphragm
8 Pressure pad
9 Flexible region
10 Diaphragm ring surface
11 Common outer edge
12 Common inner edge
13 First connection site
14 Second connection site
15 Protrusion
16 Depression
17 Insert
18 End face
P Pressure, pressure chamber with specification of the direction of the pressure or force (arrows)
"a" Distance from the connection site to the inner common edge
"c" Distance between the two connections
"d" Connection depth of the connection from the outer edge

The invention claimed is:

1. A method for connecting a diaphragm to a housing of a pressure or force sensor, the housing having a housing ring surface, wherein
 a measurement element is mounted in the housing, the element, when the finished sensor is deployed, can register an external load acting on the diaphragm, and wherein
 the housing ring surface of the housing is located opposite a diaphragm ring surface of the diaphragm so as to effect a connection between these surfaces, which, when the sensor is deployed, the connection is subjected to pressure,
 wherein,
 in the first instance a first connection is manufactured in an inner region between the housing ring surface and the diaphragm ring surface, until these surfaces abut against each other radially outside of this first connection,
 and wherein,
 subsequently a second connection is manufactured between the housing ring surface and the diaphragm ring surface, which connects the housing and the diaphragm with one another radially outside of the first connection as far as the outer common edge between the housing ring surface and the diaphragm ring surface, wherein
 a defined connection depth "d" is maintained equal to the radial distance occupied by the whole first connection plus the whole second connection and any radial distance between the first and second connections.

2. The method in accordance with claim 1,
 wherein,
 the diaphragm that is connected to the housing is suitable to be exposed to the combustion chamber of an internal combustion engine.

3. The method in accordance with claim 1,
 wherein,
 the connection depth "d" of the connection in the interior does not extend as far as the common inner edge of the housing ring surface and the diaphragm ring surface.

4. The method in accordance with claim 1,
 wherein,
 the second connection does not penetrate deeper inwards than the first connection.

5. The method in accordance with claim 1,
 wherein,
 the first connection is a joint selected from the following list of joints: a soldered joint, a brazed joint, a welded joint, a resistance welded joint, a bonded joint, and a thermal compression bonded joint.

6. The method in accordance with claim 1,
 wherein,
 the first connection is executed by resistance welding by means of an insert that is inserted into a depression.

7. The method in accordance with claim 1, wherein,
the second connection is a joint selected from the following list of joints: a laser welded joint, an electron beam welded joint, a joint welded in accordance with the argon arc method, a tungsten inert gas welded joint (TIG), a protective gas welded joint, and a bonded joint.

8. The method in accordance with claim 1, wherein,
the diaphragm that is connected to the housing is provided with a central pressure pad, which is surrounded by a flexible zone, wherein
when deployed the measurement element determines the pressure P or the external force onto the diaphragm by means of a deflection of the pressure pad.

9. The method in accordance with claim 1, wherein,
the measurement element that is mounted in the housing can register the pressure or force piezoelectrically, piezoresistively, or optically.

10. The method in accordance with claim 1, wherein,
a protrusion is arranged on one of the housing ring surface and the diaphragm ring surface, on which protrusion the first connection is executed by resistance welding as an annular protrusion weld.

11. The method in accordance with claim 10, wherein,
at least one depression is provided near the protrusion in which depression welded material of the protrusion collects in the course of the welding process.

12. A method for connecting a diaphragm to a housing of a pressure or for sensor, the housing having a housing ring surface, wherein,
a measurement element is mounted in the housing, the element, when the finished sensor is deployed, can register an external load acting on the diaphragm, and wherein
the housing ring surface of the housing is located opposite a diaphragm ring surface of the diaphragm so as to effect a connection between these surfaces, which, when the sensor is deployed, the connection is subjected to pressure,
wherein,
in the first instance a first connection is manufactured in an inner region between the housing ring surface and the diaphragm ring surface, until theses surfaces abut against each other radially outside of this first connection,
and wherein,
subsequently a second connection is manufactured between the housing ring surface and the diaphragm ring surface, which connects the housing and the diaphragm with one another radially outside of the first connection as far as the outer common edge between the housing ring surface and the diaphragm ring surface, wherein
a defined connection depth "d" is maintained equal to the radial distance occupied by the whole first connection plus the whole second connection and any radial distance between the first and second connections,
wherein,
the second connection penetrates less far than the first connection, so that a distance "c" remains between the first and second connections.

* * * * *